(12) United States Patent
Spektor et al.

(10) Patent No.: US 7,961,193 B2
(45) Date of Patent: Jun. 14, 2011

(54) VIDEO DATA PROCESSING CIRCUITS AND SYSTEMS COMPRISING PROGRAMMABLE BLOCKS OR COMPONENTS

(75) Inventors: Evgeny Spektor, Herzliya (IL); Gili Elias, Tel Aviv (IL)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/564,312

(22) Filed: Sep. 22, 2009

(65) Prior Publication Data

US 2010/0007794 A1 Jan. 14, 2010

Related U.S. Application Data

(63) Continuation of application No. 11/072,419, filed on Mar. 7, 2005, now Pat. No. 7,612,779.

(60) Provisional application No. 60/582,554, filed on Jun. 25, 2004.

(51) Int. Cl.
*G06F 15/16* (2006.01)
(52) U.S. Cl. ...................................................... 345/503
(58) Field of Classification Search ................... 345/503
See application file for complete search history.

(56) References Cited

U.S. PATENT DOCUMENTS

| | | | |
|---|---|---|---|
| 5,497,498 A | 3/1996 | Taylor | |
| 5,537,601 A | 7/1996 | Kimura et al. | |
| 5,909,559 A | 6/1999 | So | |
| 5,999,733 A | 12/1999 | Shamoto | |
| 6,188,381 B1 | 2/2001 | van der Wal et al. | |
| 6,209,077 B1 | 3/2001 | Robertson et al. | |
| 6,313,845 B1 | 11/2001 | Terry et al. | |
| 6,477,641 B2 | 11/2002 | Davis et al. | |
| 6,578,197 B1 | 6/2003 | Peercy et al. | |
| 6,629,312 B1 | 9/2003 | Gupta | |
| 6,717,581 B2 | 4/2004 | Langendorf | |
| 6,809,732 B2 | 10/2004 | Zatz et al. | |
| 6,873,331 B2 | 3/2005 | Emmot et al. | |
| 6,891,592 B2 | 5/2005 | Magana et al. | |
| 7,176,914 B2 | 2/2007 | Emmot | |
| 7,308,608 B1 * | 12/2007 | Pleis et al. | 714/30 |
| 7,333,108 B2 | 2/2008 | Takahashi | |
| 7,359,334 B2 | 4/2008 | Matsunaga et al. | |
| 7,612,779 B2 | 11/2009 | Spektor et al. | |
| 2002/0081090 A1 | 6/2002 | Agnihotri et al. | |
| 2002/0099980 A1 | 7/2002 | Olarig | |
| 2003/0037335 A1 | 2/2003 | Gatto et al. | |
| 2003/0038842 A1 | 2/2003 | Peck et al. | |

(Continued)

FOREIGN PATENT DOCUMENTS

EP    1063801 A2    12/2000

OTHER PUBLICATIONS

Clarke, Peter, "Startup Tips Application-Specific Video Processor", May 2001, EETimes.

*Primary Examiner* — Ryan R Yang
(74) *Attorney, Agent, or Firm* — Sterne, Kessler, Goldstein & Fox P.L.L.C.

(57) ABSTRACT

The invention refers to a video data processing system and a video data processing circuit, comprising at least two functional blocks of which at least a first functional block is programmable so that different functions can be provided by said first functional block.

29 Claims, 2 Drawing Sheets

U.S. PATENT DOCUMENTS

| | | |
|---|---|---|
| 2003/0156188 A1 | 8/2003 | Abrams |
| 2004/0012597 A1 | 1/2004 | Zatz et al. |
| 2004/0205217 A1 | 10/2004 | Gabrani et al. |
| 2005/0140688 A1 | 6/2005 | Pallister |
| 2005/0283559 A1 | 12/2005 | Arad |
| 2005/0289507 A1 | 12/2005 | Spektor et al. |
| 2005/0289523 A1 | 12/2005 | Spektor et al. |
| 2006/0174230 A1 | 8/2006 | Drayton et al. |

\* cited by examiner

VIDEO DATA PROCESSING CIRCUITS AND SYSTEMS COMPRISING PROGRAMMABLE BLOCKS OR COMPONENTS

CROSS REFERENCE TO RELATED APPLICATIONS

This application is a continuation of U.S. application Ser. No. 11/072,419 filed on Mar. 7, 2005, and titled "Video Data Processing Circuits and Systems Comprising Programmable Blocks or Components" which claims benefit of U.S. provisional application No. 60/582,554 filed on Jun. 25, 2004, and titled "Video Data Processing Circuits and Systems Comprising Programmable Blocks or Components," each of which is incorporated by reference herein in its entirety.

BACKGROUND OF THE INVENTION

1. Field of the Invention

The present invention relates generally to video and/or graphics data processing circuits and systems, in particular mounted e.g. to PVRs (Personal Video Recorders) and to video and/or data processing cards for computers, e.g. PCs (Personal Computers), Laptops, etc., and/or for set-top boxes, and so on. Video data processing in the context of the invention comprises cards processing moving graphics (video etc.) and/or still graphics (pictures, CAD/CAM data), where necessary combined with audio data etc.

2. Background Art

Figure 1:
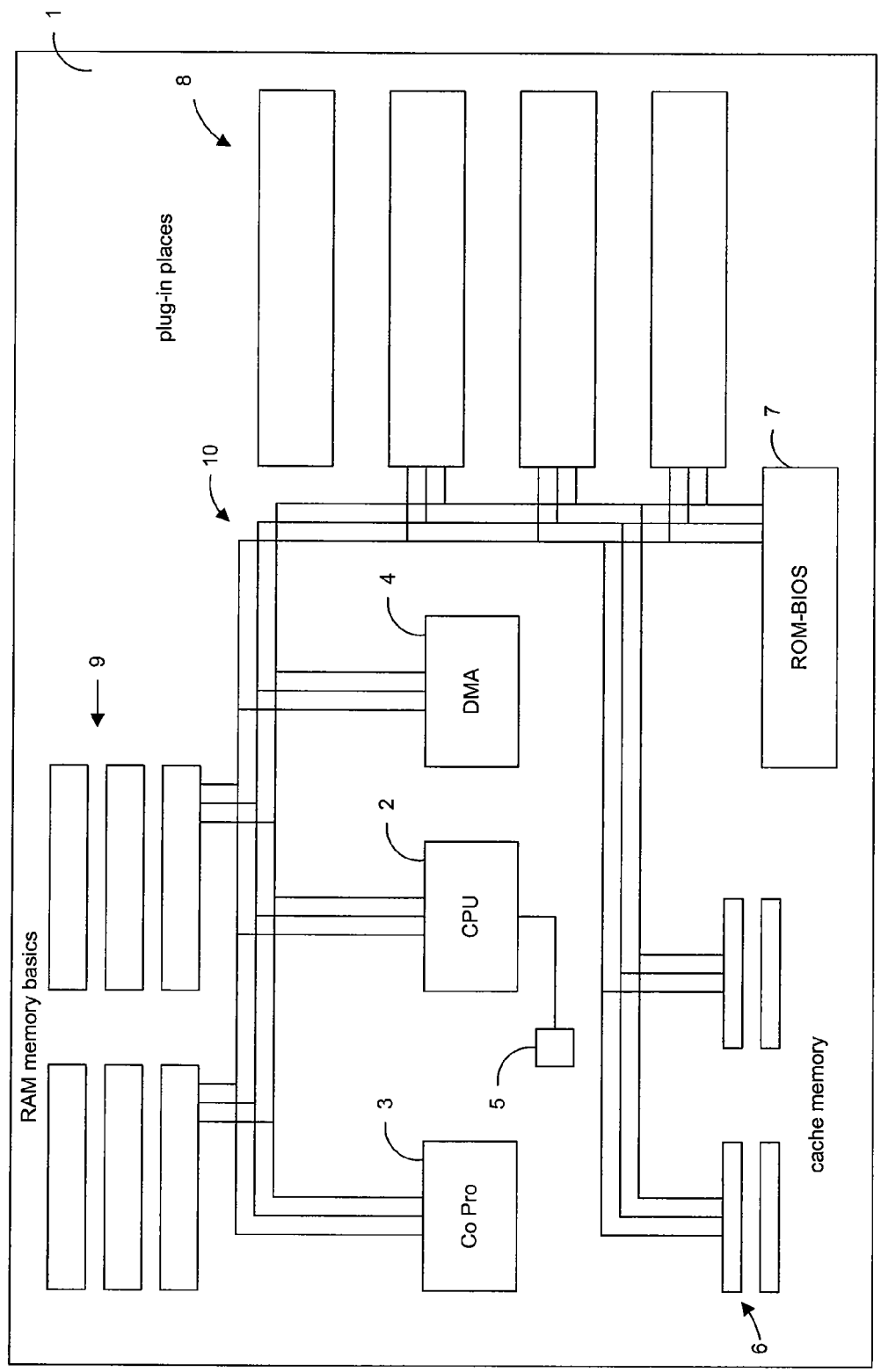

Referring now to FIG. 1, there is shown a motherboard 1 of a PC (personal computer) according to the prior art.

Typically, the motherboard 1 comprises a CPU 2, a co-processing component (CoPro 3), a Direct Memory Access component (DMA 4), a quartz or crystal oscillator 5, cache memory components 6, a RAM-BIOS component 7, several plug-in places or card slots 8, and memory banks 9, etc.

As can be seen from FIG. 1, the several components of the motherboard 1 are linked by one or several bus systems comprising e.g. respective data, address, and/or control buses, e.g., a PCI bus system 10.

Further, into the above memory bank 9, one or several SIMM modules can be plugged, each carrying several RAM components, e.g., respective DRAM (or VRAM) memory chips.

Further, into the plug-in places 8—optionally—one or several peripheral component cards can be plugged in, e.g., respective sound cards, video data processing cards, graphic data processing cards, modem cards, etc.

For example, a video data processing card might e.g. control the data interchanged between the PC and a monitor connected thereto.

The video (and/or audio) data processing card might comprise one or several non-programmable data processing chips, each performing a specific, predefined function. Further—optionally—the video data processing card might comprise one or several memory chips interacting with the one or several non-programmable data processing chips.

Further, for example, a video data processing card might e.g. control the data (e.g., the video and/or audio data) interchanged between e.g. the PC, and an external (cable or satellite) network (e.g., a TV network, a network providing video on demand, etc.).

The video data processing card might comprise one or several non-programmable data processing chips, each performing a specific, predefined function. Further—optionally—the video data processing card might comprise one or several memory chips interacting with the one or several non-programmable data processing chips.

The prior art systems as described above have several disadvantages.

For instance, due to the fact that the above graphic and/or video data processing cards comprise one or several non-programmable data processing chips each performing a specific, predefined function, the cards show little flexibility as to their functionality. If a different functionality is needed in general a different card has to be used.

Therefore, what is needed is new system and a new method, in particular, new graphic and/or video data processing circuits, with which the above and/or other drawbacks of the prior art might be overcome.

Further limitations and disadvantages of conventional and traditional approaches will become apparent to one of skill in the art, through comparison of such systems and methods with the present invention as set forth in the remainder of the present application with reference to the drawings.

BRIEF SUMMARY OF THE INVENTION

According to the present invention, these objects are achieved by video data processing circuits and systems as defined in the claims. The dependent claims define advantageous and preferred embodiments of the present invention. It is understood that within the context of the invention, video data comprise data of still graphics (e.g. pictures) and data of moving graphics (e.g. video), as well as multimedia (audio etc.) data. A video data processing circuit can thus be a, or be part of a, for example, graphics card, video card, and multimedia card. Typical applications are the use for PVR (Personal Video Recorder) products, or other video encoder products like PC video capture cards (with, e.g. PCI or USB interface) and the like.

According to an aspect of the invention, a video data processing circuit comprises at least two functional blocks of which at least a first functional block is programmable so that different functions can be provided by said first functional block. This can be a first block and a second block, the first block being programmable such as to either provide a first or a second function that is different from the first function. In general, the number of functions of each block is not limited. Examples for functions are: video capture, VBI (Vertical Blanking Interval) data processing, motion estimation, video processor, Huffman coding, bit rate management etc.

In a preferred embodiment, the video data processing circuit comprises at least one more programmable functional block so that different functions can be provided by said functional block. The functions of the different blocks can be the same over the same period of time—e.g. changed simultaneously—or they can provide different functions. For example, the second block can be programmable such as to either provide a third or a fourth function, the fourth function different from the third function.

As set out above, the video data processing circuit can principally comprise many programmable functional blocks. For example, it can additionally contain a third block (and/or further blocks), the third block (and/or the further blocks) being programmable such as to either provide a fifth, or a sixth function (and/or further functions) different from the fifth function. In short, each programmable functional block can have its own function and/or respective program or a function and/or a respective program common to more than one block.

In one embodiment, at least one block, preferably all of the blocks, are programmable such that, depending on the desired function of the blocks or circuit, resp., the data flow between at least one pair of blocks or the blocks in general can be specified. For example, by programming a block, the data link to the other block(s) can be specified.

Preferably, the data flow between blocks can have a different bit rate. For example, the bit rate for the data flow from the first block to the second block can be higher than the bit rate for the data flow from the first block to the third block.

Then, it is preferable if the bit rate is selectable such that a data flow between said blocks is configurable. Thus the data path(s) can be configured, resulting, e.g. in a data flow from one first block to another second block under a first configuration and a (reversed) data flow from one block to another block under a first configuration and a (reversed) data flow from the second block to the first block under a second configuration after reprogramming, and so on for other blocks etc.

According to a further aspect of the invention, a video data processing system comprises at least a first and a second video data processing circuit, at least the first circuit being programmable so that different functions can be provided at least by said first circuit. For example, at least a first and a second graphics (i.e. video and/or still graphics and/or audio) data processing circuit are provided, the first circuit being programmable such as to either provide a first or a second function, the second function being different from the first function.

In a variant, the second circuit is programmable, too, so that different functions can be provided by said second circuit. In a preferred embodiment, the second circuit provides different functions compared to said first circuit. For example, the second circuit can be programmable such as to either provide a third, or a fourth function different from the third function.

Examples for functions are: video capture, VBI (Vertical Blanking Interval) data processing, motion estimation, video processor, Huffman coding, bit rate management etc.

It is also possible that the data flow between said circuits has a different bit rate. This includes the case when one or more of the bit rates are zero. In that case the data flow between the blocks can be configured, i.e. the path of data through the system or video card. Then the data may flow, for example, from a first block to a second block, and—after reconfiguration of the bit rates—from the second block to the first block etc. etc.

The video data processing circuit(s) and/or system(s) are preferably used with e.g. graphics cards that control the data interchanged between the PC, and a monitor connected thereto, or with graphics/video cards that control the data interchanged between e.g. the PC, and an external network, or within a set-top box or PVR systems.

Thus, the present invention provides for a more flexible graphic and/or video data processing. Further, in a variant, task oriented programming might be made possible.

These and other advantages, aspects and novel features of the present invention, as well as details of an illustrated embodiment thereof, will be more fully understood from the following description and drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 1 illustrates a motherboard of a prior art PC.

Figure 2:
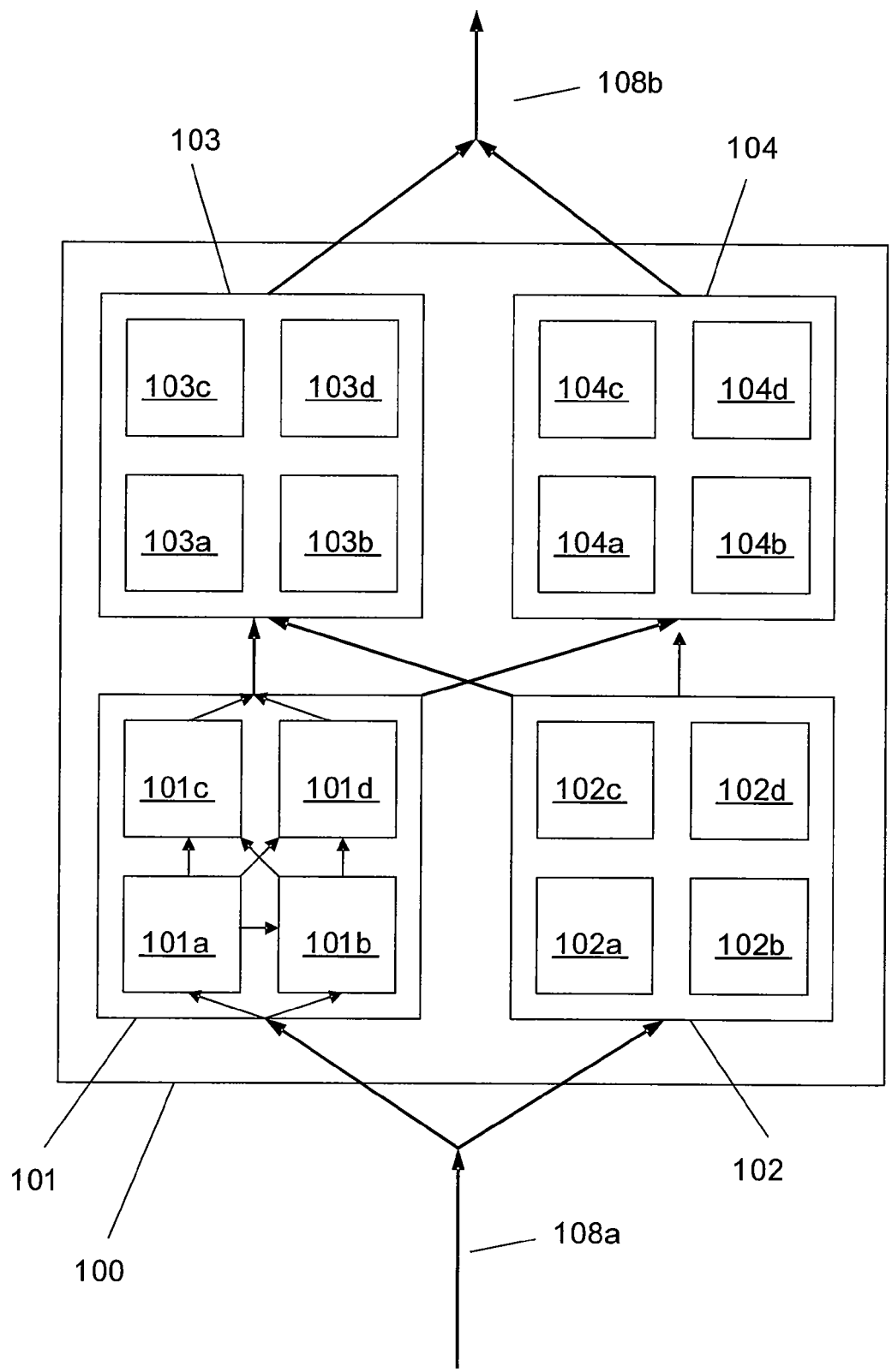

FIG. 2 schematically illustrates a card/module with several video and/or graphic data processing circuits in accordance with an embodiment of the present invention.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known processes and steps have not been described in detail in order not to unnecessarily obscure the present invention.

Referring now to FIG. 2, there is shown a card/electronic module 100 with several video and/or graphic data processing circuits 101, 102, 103, 104 (here: several video and/or graphic data processing chips 101-104) in accordance with an embodiment of the invention.

The card 100 might e.g. serve as a video and/or graphic data processing card/module for e.g. computers, for instance Personal Computers, Laptops, etc., and/or for set-top boxes, and/or any other suitable electronic system. For this purpose, the card 100 might e.g. be plugged into a respective plug-in place, e.g. one of the plug-in places 8 of the PC motherboard 1 shown in FIG. 1.

The card might e.g. control the data interchanged between e.g. the PC (or any other suitable electronic system), and a monitor connected thereto, and/or might e.g. control the data (e.g., the video and/or audio data) interchanged between e.g. the PC (or any other suitable electronic system), and an external (cable or satellite) network (e.g., a TV network, a network providing video on demand, etc.), etc.

The above graphics (i.e. video and/or graphic) data processing circuits 101, 102, 103, 104—just as conventional circuits—each comprise several (here: four) functional blocks 101a-d, 102a-d, 103a-d, 104a-d.

In contrast to the prior art, some or all of the functional blocks 101a-d, 102a-d, 103a-d, 104a-d (e.g., one, two or three, etc. functional blocks of a specific circuit) do not fulfill only a predefined function (e.g., a function defined by the specific hardware used in the respective functional block). Instead, some or all of the functional blocks 101a-d, 102a-d, 103a-d, 104a-d—flexibly—might fulfill one of several, different functions defined by a specific software used for the respective functional block 101a-d, 102a-d, 103a-d, 104a-d. Hence, some or all of the functional blocks 101a-d, 102a-d, 103a-d, 104a-d might be programmable (such that e.g. the first functional block 101a of the first circuit 101 might e.g. be programmable such as to either provide a first, or a second function different from the first function (and/or a third function different from the first and second function), and/or that e.g. the second functional block 101b of the first circuit 101 might e.g. be programmable such as to either provide a fourth, or a fifth function different from the fourth function (and/or a sixth function different from the fourth and fifth function), etc., etc.).

For this purpose, one or several additional memory components might be provided on the card 100 (or externally), on which—depending on the specific function elected to be performed by a respective functional block—a respective software is stored which when executed on the respective functional block causes the functional block to fulfill the specific, elected function.

If a different or amended function is desired for one or several blocks of one or several circuits 101-104, i.e., an amended function for the whole card 100 is desired, instead of having to use a completely different card, simply a new or amended software is stored/installed on the above additional memory component(s).

Examples for functions are: video capture, VBI (Vertical Blanking Interval) data processing, motion estimation, video processor, Huffman coding, bit rate management etc. An example for using the different functions is when a video data card firstly utilizes its video/graphics processor to capture data (e.g. a video stream from a DSL subscriber line), and then after a reprogramming (reconfiguration) uses its video processor to modify the captured data before further processing. This enables features like OSD (On Screen Display) etc.

As is schematically shown in FIG. 2, in an embodiment, respective data (e.g., the video and/or audio data) is input into the card 100 at a respective input 108a, and fed to e.g. the first circuit 101 and/or the second circuit 102, processed by the respective circuit, and then—optionally—fed to one or several other circuits 103, 104 (and further processed), etc., etc., and then output (e.g. by the third and/or fourth circuit, etc.) at a respective output 108b.

In an embodiment, depending on the respective desired function of the card 100 (i.e., the respective software used for the above several programmable functional blocks 101a-d, 102a-d, 103a-d, 104a-d), for example, the input data either e.g. flows to the first, or the second circuit 101, 102, and/or the data output by e.g. the first circuit 101 either e.g. flows to the third, or the fourth circuit (and/or e.g. the data output by e.g. the second circuit 102 either e.g. flows to the third, or the fourth circuit), etc., etc, as schematically indicated by the respective arrows.

Thereby, e.g., the data might flow from the first to the third circuit with e.g. a first bit rate, and the data might flow from the first to the fourth circuit with e.g. a second bit rate, the second bit rate being different from the first bit rate (the second bit rate e.g. being bigger (or smaller), than the first bit rate) (correspondingly, the data might e.g. flow from the second to the third circuit with e.g. a third bit rate, and the data might e.g. flow from the second to the fourth circuit with e.g. a fourth bit rate, the fourth bit rate being different from the third bit rate (the fourth bit rate e.g. being bigger (or smaller), than the third bit rate)).

Correspondingly, inside the respective circuits, depending on the respective software used for the above several programmable functional blocks 101a-d, 102a-d, 103a-d, 104a-d, for example, the data input into a respective circuit 101 either e.g. flows to a first 101a, or a second block 101b of the respective circuit 101, and/or the data output by e.g. a first block 101a of a circuit 101 either e.g. flows to a third 101c, or a fourth block 101d of a circuit (and/or e.g. the data output by e.g. a second block 101b of a circuit 101 either e.g. flows to a third 101c, or a fourth block 101d of a circuit), etc., etc.

Thereby, e.g., the data might flow from a first block 101a to a third block 101c of a circuit 101 with e.g. a first bit rate, and the data might flow from a first 101a to a fourth block 101d of a circuit 101 with e.g. a second bit rate, the second bit rate being different from the first bit rate (e.g. being bigger (or smaller), than the first bit rate) (correspondingly, the data might e.g. flow from a second 101b to a third block 101c of a circuit 101 with e.g. a third bit rate, and the data might e.g. flow from a second 101b to a fourth block 101d of a circuit 101 with e.g. a fourth bit rate, the fourth bit rate being different from the third bit rate (the fourth bit rate e.g. being bigger (or smaller), than the third bit rate)).

The card 100 (i.e., the interacting—programmable—circuits 101-104 (by use of the—interacting—programmable blocks within the circuits 101-104)) might fulfill a function corresponding to that of an ordinary video and/or graphic data processing card/module, and/or any other suitable video and/or audio data processing function, etc.

Due to the programmability of the several interacting blocks and/or circuits, a much bigger flexibility is achieved, as by the use of conventional graphic and/or video data processing cards.

Thus, the present invention provides for a more flexible graphic and/or video data processing.

Further, task oriented programming might be made possible.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

Generally, the data path(s), bit rates, and data protocols used are not limited but can be programmed by the one skilled in the art as to the best effect.

What is claimed is:

1. A video data processing circuit for receiving input video data and outputting processed video data, comprising:
   a first functional block configured to perform a first function from among a plurality of functions on the input video data, the first functional block being programmable to change its functionality from the first function to a second function from among the plurality of functions, the second function being different from the first function;
   a second functional block, coupled to the first functional block, configured to perform a third function from among the plurality of functions on the input Video data, the third function being different from the first function;
   a third functional block, coupled to the first functional block and the second functional block, configured to perform a fourth function from among the plurality of functions to provide the processed video data; and
   a fourth functional block, coupled to the first functional block and the second functional block, configured to perform a fifth function from among the plurality of functions to provide the processed video data,
   wherein the first functional block is configured to provide data to the second functional block at a first bit rate, wherein the first functional block is configured to provide data to the third functional block at a second bit rate, wherein the first functional block is configured to provide data to the fourth functional block at a third bit rate, and wherein the first bit rate, the second bit rate, and the third bit rate are different.

2. The video data,processing circuit of claim 1, wherein the plurality of functions includes at least one of:
   video capture;
   vertical blanking interval (VBI) data processing;
   motion estimation;
   video processing;
   Huffman coding; and
   bit management.

3. The video data processing circuit of claim 1, wherein the second functional block is programmable to change its functionality from the third function to a fourth function from among the plurality of functions, the fourth function being different from the third function.

4. The video data processing circuit of claim 3, wherein the first functional block changes its functionality substantially simultaneously with the second functional block.

5. The video data processing circuit of claim 1, wherein the third functional block is programmable to change its functionality from the fourth function to a sixth function from among the plurality of functions.

6. The video data processing circuit of claim 1, wherein the fourth function is substantially similar to at least one of a group consisting of: the first function, the second function, and the third function.

7. The video data processing circuit of claim 1, wherein the fourth function is different from the sixth function.

8. The video data processing circuit of claim 1, wherein the fourth functional block is programmable to change its functionality from the fifth function to a seventh function from among the plurality of functions.

9. The video data processing circuit of claim 8, wherein the fifth function is different from the seventh function.

10. The video data processing circuit of claim 1, wherein the fifth function is substantially similar to at least one of a group consisting of: the first function, the second function, and the third function.

11. The video data processing circuit of claim 1, wherein the third function is a predefined function.

12. The video data processing circuit of claim 11, wherein the predefined function is a function defined by hardware used in the second functional block.

13. The video data processing circuit of claim 1, further comprising:
at least one memory component configured to store a first software program configured to fulfill the first function when it is executed by the first functional block and a second software program configured to fulfill the second function when it is executed by the first function block, the first functional block being configurable to load the first software program to perform the first function and to change its functionality from the first function to the second function by loading the second software program.

14. The video data processing circuit of claim 1, wherein the first functional block is configured to receive at least one of moving graphics and still graphics and to process the at least one of the moving graphics and the still graphics in accordance with the first function.

15. A video data processing system for receiving input video data and outputting processed video data, comprising:
a first circuit configured to operate on the input data;
a second circuit configured to operate on the input data;
a third circuit, coupled to at least one of the first circuit and the second circuit, configured to provide the processed video data; and
a fourth circuit, coupled to at least one of the first circuit and the second circuit, configured to provide the processed video data,
wherein at least one of the first circuit, the second circuit, the third circuit, and the fourth circuits includes:
a first functional block configured to perform a first function from among a plurality of functions, the first functional block being programmable to change its functionality from the first function to a second function from among the plurality of functions, the second function being different from the first function,
wherein the at least one of the first circuit, the second circuit, the third circuit, and the fourth circuits further includes:
a third functional block, coupled to the first functional block and the second functional block, configured to perform a fourth function from among the plurality of functions; and
a fourth functional block, coupled to the first functional block and the second functional block, configured to perform a fifth function from among the plurality of functions,
wherein the first functional block is configured to provide data to the second functional block at a first bit rate,
wherein the first functional block is configured to provide data to the third functional block at a second bit rate,
wherein the first functional block is configured to provide data to the fourth functional block at a third bit rate, and wherein the first bit rate, the second bit rate, and the third bit rate are different.

16. The video data processing system of claim 15, wherein the at least one of the first circuit, the second circuit, the third circuit, and the fourth circuits further includes a second functional block, coupled to the first functional block, configured to perform a third function from among the plurality of functions, the third function being different from the first function.

17. The video data processing system of claim 16, wherein the second functional block is programmable to change its functionality from the third function to a fourth function from among the plurality of functions, the fourth function being different from the third function.

18. The video data processing system of claim 17, wherein the first functional block changes its functionality substantially simultaneously with the second functional block.

19. The video data processing system of claim 15, wherein the plurality of functions includes at least one of:
video capture;
vertical blanking interval (VBI) data processing;
motion estimation;
video processing;
Huffman coding; and
bit rate management.

20. The video data processing system of claim 15, wherein the third functional block is programmable to change its functionality from the fourth function to a sixth function from among the plurality of functions.

21. The video data processing system of claim 15, wherein the fourth function is substantially similar to at least one of a group consisting of: the first function, the second function, and the third function.

22. The video data processing system of claim 15, wherein the fourth function is different from the sixth function.

23. The video data processing system of claim 15, wherein the fourth functional block is programmable to change its functionality from the fifth function to a seventh function from among the plurality of functions.

24. The video data processing system of claim 23, wherein the fifth function is different from the seventh function.

25. The video data processing system of claim 15, wherein the fifth function is substantially similar to at least one of a group consisting of: the first function, the second function, and the third function.

26. The video data processing system of claim 15, wherein the third function is a predefined function.

27. The video data processing system of claim 26, wherein the predefined function is a function defined by hardware used in the second functional block.

28. The video data processing system of claim 15, further comprising:

at least one memory component configured to store a first software program configured to fulfill the first function when it is executed by the first functional block and a second software program configured to fulfill the second function when it is executed by the first function block, the first functional block being configurable to, load the first software program to perform the first function and to change its functionality from the first function to the second function by loading the second software program.

29. The video data processing system of claim 15, wherein the first functional block is configured to receive at least one of moving graphics and still graphics and to process the at least one of the moving graphics and the still graphics in accordance with the first function.

\* \* \* \* \*

UNITED STATES PATENT AND TRADEMARK OFFICE
CERTIFICATE OF CORRECTION

PATENT NO. : 7,961,193 B2  
APPLICATION NO. : 12/564312  
DATED : June 14, 2011  
INVENTOR(S) : Spektor et al.

Page 1 of 1

It is certified that error appears in the above-identified patent and that said Letters Patent is hereby corrected as shown below:

Claims

Col. 6, line 58, "video data,processing circuit" should read --video data processing circuit--.

Signed and Sealed this
Twentieth Day of December, 2011

David J. Kappos
*Director of the United States Patent and Trademark Office*